(12) United States Patent  
Chatterjee et al.

(10) Patent No.: US 8,725,561 B1  
(45) Date of Patent: May 13, 2014

(54) ATTRIBUTING CALLS TO PUBLISHER SITES

(75) Inventors: Surojit Chatterjee, Fremont, CA (US); Anshul Kothari, Sunnyvale, CA (US); Zhou Jian, Milpitas, CA (US)

(73) Assignee: Google Inc., Mountain View, CA (US)

( * ) Notice: Subject to any disclaimer, the term of this patent is extended or adjusted under 35 U.S.C. 154(b) by 327 days.

(21) Appl. No.: 13/168,767

(22) Filed: Jun. 24, 2011

(51) Int. Cl.
    *G06Q 30/00* (2012.01)
    *G06Q 90/00* (2006.01)

(52) U.S. Cl.
    CPC .................... *G06Q 90/00* (2013.01)
    USPC ........................................... 705/14.1

(58) Field of Classification Search
    CPC ................................................. G06Q 90/00
    USPC ........................................... 705/14.1
    See application file for complete search history.

(56) References Cited

U.S. PATENT DOCUMENTS

2007/0143182 A1*  6/2007  Faber et al. ................ 705/14

* cited by examiner

*Primary Examiner* — Daniel Lastra (74) *Attorney, Agent, or Firm* — Birch, Stewart, Kolasch & Birch, LLP (57) ABSTRACT

Systems and methods for attributing an ad impression due to a telephone call generated from a displayed advertisement are discussed herein. Techniques and systems for managing a pool of phone numbers and allocating phone numbers from that pool to advertisements for display and presentation and also tracking the number allocation time and de-allocating numbers for re-use are also discussed herein. Also, systems and methods for attributing particular calls to particular advertisements based on the ongoing phone number allocation are discussed.

22 Claims, 3 Drawing Sheets

ATTRIBUTING CALLS TO PUBLISHER SITES

FIELD OF ENDEAVOR

The present document relates to methods and mechanisms to improve tracking and attribution of advertising impressions. Specifically, it relates to the identification of calls arising from ads displayed on a publisher website and the proper attribution thereof, and also to phone number management and allocation schemes associated therewith.

BACKGROUND

An ongoing difficulty with correctly attributing and quantifying ad impressions is that, unlike direct-interaction scenarios, there is both a physical and temporal disconnect between the impression created by the ad and any action taken by the user as a result thereof. When a user sees a clickable ad that takes him or her to a landing page, or is presented with an advertisement containing an embedded phone number on a call-capable mobile device, the user may interact with that advertisement directly and immediately and that interaction may be identified and logged to track ad effectiveness.

By contrast, when a user is exposed to an advertisement via an information display that does not permit or allow for direct ad interaction (such as an information display monitor or an electronic billboard) or is presented with an ad containing a phone number on a device that cannot make phone calls (i.e. a desktop or laptop or netbook computer or a media tablet/media player not configured to make telephone calls), it is more difficult to determine if a user acted based on the advertisement.

Specifically in the context of telephone numbers, a user may write down a number and call it at a later time, or may call the number immediately but from a different device. This creates some difficulties for distributors of advertising content with respect to determining the appropriate price/cost of advertising space on a publisher's media outlet since there is no measurable, causal connection between a user viewing the advertisement and making a subsequent telephone call and/or taking some other kind of action.

SUMMARY

Aspects of the solutions discussed herein pertain to a method of managing a pool of phone numbers to be associated with advertisements and for attributing an ad impression on publisher media outlets based on a call to an associated phone number, the method comprising the steps of: connecting a unique phone number from the managed phone number pool with an advertisement such that each unique phone number is associated with only one advertisement; setting a connection time period for the connection between that phone number and that connected advertisement; and serving the connected advertisement via the media outlet, where the unique telephone number is displayed in the advertisement.

In some variations, such a method may also include the steps of: initiating a countdown of the connection time upon serving the connected advertisement; registering a call to the unique telephone number; identifying the connected advertisement connected to the unique phone number; attributing an ad impression to the media outlet based on the identified advertisement; and checking, after initiating the countdown, if the connection period is expired.

If the connection period is expired, releasing the connection between the phone number and the connected advertisement such that the number is no longer connected to the ad. If the connection period is not yet expired, determining if at least one call was made to the connected number between a current checking step and a previous checking step; adjusting a remaining time for the connection period based on the determining; and waiting a predetermined time before performing a subsequent checking step.

In some variations of such a method, the media outlet is a website. In further variations, the advertisement is an advertisement directed towards at least one of a particular geographic region and a particular time period. In yet further variations, the unique telephone number is a telephone number that is a local and/or toll-free call in the particular geographic region. In further variations still, the media outlet is an electronic billboard.

In some variations, the step of identifying includes determining if the unique telephone number is still associated with the connected advertisement. In further variations, the step of connecting includes recording data about the unique phone number and the connected advertisement in a connection database, the step of releasing includes indicating, in the connection database, that the recorded data does not pertain to an active number to advertisement connection, and the step of identifying includes querying the connection database. In yet further variations, the step of serving further includes serving the connected ad in response to an advertisement request from the media outlet. In further variations still, the step of serving includes serving the connected advertisement only once via the media outlet.

In some variations, the method further includes a step of monitoring a size of the available number pool and suppressing display of the unique telephone number when the number pool is below a threshold size. In further variations, the method further comprises a step of monitoring a call volume associated with the advertisement and suppressing display of the unique telephone number for connected advertisements created from that advertisement when the call volume for that advertisement is above a threshold level.

In some variations, the step of connecting includes creating at least one connected advertisement from an advertisement by connecting the advertisement to a unique phone number. In further variations, the step of determining includes determining a total number of calls to the connected number between the current and previous checking steps. In yet further variations, the step of adjusting includes increasing the remaining time by an amount based on a difference between the remaining connection time and a total connection time. In further variations still, the step of adjusting includes decreasing the remaining time by an amount based on at least one of: a size of the number pool, a unique phone number allocation rate, and an allocated unique phone number release rate.

Further aspects of the solutions discussed herein pertain to a method of managing a phone number pool for tracking ad impressions on publisher media outlets, the method comprising: connecting a unique phone number from an available number pool with an advertisement such that each unique phone number is associated with only one advertisement; and setting a connection time period for the connection between that phone number and that advertisement. Variations of such a method may also include the steps of initiating a countdown of the connection time based on a predetermined countdown initiation event; checking, after the step of initiating, if the connection period is expired; if the connection period is expired, releasing the connection between the phone number and the advertisement such that the number is no longer connected to the ad; and if the connection period is not yet expired, determining if at least one call was made to the connected number between a current checking step and a previous checking step; adjusting a remaining time for the connection period based on the determining step; and waiting a predetermined time before performing a subsequent checking step.

In some variations, the step of determining includes determining a total number of calls to the connected number between the current and previous checking steps. In further variations, the step of adjusting includes increasing the remaining time by an amount based on a difference between the remaining connection time and a total connection time. In further variations still, the step of adjusting includes decreasing the remaining time by an amount based on at least one of: a size of the number pool, a unique phone number allocation rate, and an allocated unique phone number release rate.

In some variations, the method further includes the step of allowing advertisers to bid on number-connected ads and connecting the unique phone number with an advertisement based on available number pool size and an associated advertiser bid for that advertisement.

Further aspects of the solutions discussed herein pertain to a system for managing a phone number pool for tracking ad impressions on publisher media outlets, the system comprising: a number allocator that connects a unique phone number from an available number pool with an advertisement such that each unique phone number is associated with only one advertisement; a number-to-ad connection database, operably connected to the number allocator, that stores a connection time period for the connection between said phone number and said advertisement; where the number allocator is configured to: initiate a countdown of the connection time based on a predetermined countdown initiation event; query the number-to-ad connection database to determine if the connection period is expired; and if the connection period is expired: to release the connection between the phone number and the advertisement such that the number is no longer connected to the ad and update the number-to-ad connection database accordingly; and if the connection period is not yet expired, to determine, by checking with a telephony server, if at least one call was made to the connected number between a current query operation and a previous query operation; adjust a remaining time for the connection period based on a number of determined calls; and wait a predetermined time before performing a subsequent query operation.

Yet further aspects of the solutions discussed herein pertain to a non-transitory computer-readable medium having embodied thereon a program that, when executed by one or more processors, causes said one or more processors to carry out a method according to one or more of the variations described above.

Further scope of applicability of the systems and methods discussed will become apparent from the detailed description given hereinafter. However, it should be understood that the detailed description and specific examples, while indicating preferred embodiments of the systems and methods, are given by way of illustration only, since various changes and modifications within the spirit and scope of the concepts disclosed herein will become apparent to those skilled in the art from this detailed description.

BRIEF DESCRIPTION OF THE DRAWINGS

The systems and methods discussed will become more fully understood from the detailed description given herein below and the accompanying drawings which are given by way of illustration only, and thus are not limitative, and wherein.

The drawings will be described in detail in the course of the detailed description.

DETAILED DESCRIPTION

The following detailed description refers to the accompanying drawings. The same reference numbers in different drawings identify the same or similar elements. Also, the following detailed description does not limit the concepts discussed. Instead, the scope of the concepts discussed herein is defined by the appended claims and equivalents thereof.

It would be an advance in the art to track establish and manage connections between ads and phone numbers so that a particular ad hosted on a particular publisher site can be connected to a phone call to a particular number, thereby providing a more accurate evaluation of ad impressions created on a publisher's media outlet.

A particular challenge of such a phone number association scheme, however, is the potentially limitless number of phone numbers required to uniquely identify each advertisement. One possible solution to this phone number management problem is to dynamically assign or associate phone numbers with advertisements on an ongoing basis so that a limited pool of phone numbers may be used to track a potentially unlimited number of advertisements by tracking and managing the associations between the ads and the phone numbers.

Although a brute-force solution to the question of attributing calls to ads from publisher sites is to simply assign each advertisement served on a particular publisher site a unique phone number, such a solution is unwieldy and resource-prohibitive. Assuming there are, at a conservative estimate, 100 million different advertisement/publisher site combinations for advertisements served in the USA, assigning a unique number to each ad/site combination would take up over 10% of all available US telephone numbers under the current phone number allocation scheme. The present document therefore proposes a more elegant solution that dynamically assigns and releases phone numbers from a common number pool according to an allocation scheme across all ads and all publisher sites.

When an ad bearing an associated phone number from the number pool is served to a publisher outlet (such as a website, electronic billboard, information kiosk, or other form of dynamically updated data display), the geo-temporal circumstances of the ad serving event may be identified and preserved. The volume and frequency of calls to the associated number during/after the ad serving event may also be identified and preserved. A geo-temporal correlation between ad serving and phone number response periods may then be developed to identify a likely period of response to the phone number during which it should remain associated with the advertisement.

Figure 1:
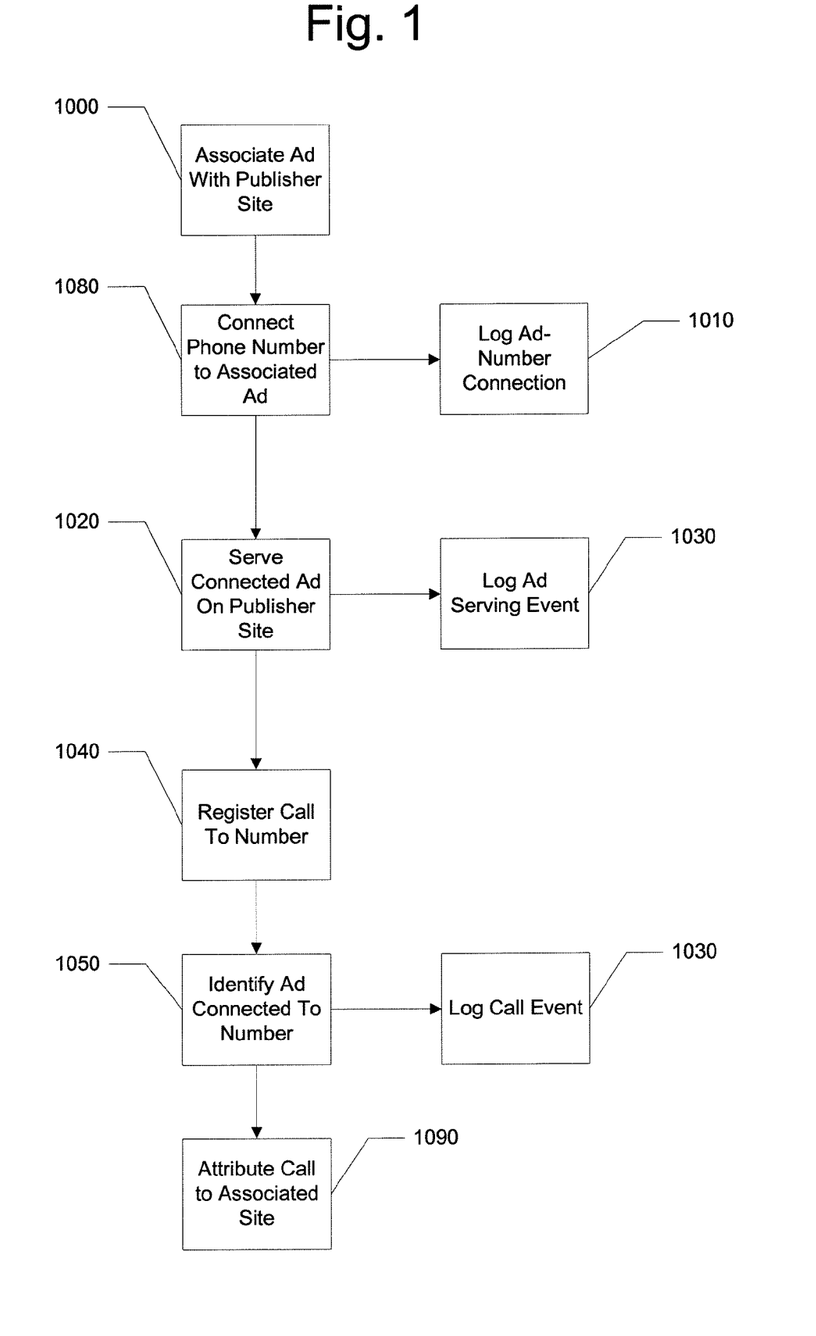
FIG. 1 depicts a block diagram of an embodiment of a phone number assignment and tracking method according to some variations described herein.

An embodiment of a phone number assignment and tracking method is depicted in FIG. 1. In the embodiment shown, an advertisement is associated with a publisher site 1000. At this stage, an advertisement is identified as being specific to a particular publisher's site, such as advertisements to be displayed on the New York Times™ or Amazon™ or other public and/or private web site(s). In some variations, an advertisement may be associated with only one particular publisher and/or publisher site at a given time. Publishers may have multiple sites, such as the Dow Jones™ group, which publishes multiple publications—each having their own website. Other publishers may only have one or two pages of an overall site. An advertisement is therefore preferably associated with a publisher 1000, and may also be associated a site or sub-site of that publisher.

In further variations, ads in one or more specific languages may be associated with particular domains and/or language-oriented sub-sites within a publisher's site. In some variations, a publisher may have one or more ID numbers or other identification indicators, where each ID number may be associated with at least one page of at least one website for at least one language and/or geographic domain and/or region. In such variations, an advertisement meant to be displayed on the Russian-language version of a publisher's multiple language-specific websites but accessed from the Washington, D.C. may have a different publisher association than an advertisement meant to be displayed on the same website, in Russian, but accessed from Moscow. In further such variations, an advertisement meant to be displayed in Shanghai on a Mandarin-language version of a site may have a different association than an advertisement meant to be displayed in Shanghai on the Cantonese-language version of the same site. Yet further such variations may employ further and more granular distinctions as required by a particular publisher.

After an advertisement has been associated with a publisher 1000, one or more phone numbers may be connected to the advertisement 1080. A phone number may be selected from among a pool of all available phone numbers or may be selected from one or more limited number pools based on a variety of factors. In some variations, a local, national, or international toll-free number may be connected to an advertisement. In other variations, a regionally suitable number from a pool of regionally suitable numbers may be connected to an advertisement. In some variations, the region may be a country or a particular telephone exchange. In other variations, the region may be a state or territory within a country, such as a particular state or even an area code within a given state.

A pool of available numbers may be divided into pools by country, region, and toll-free or toll-based characteristics. In some variations, a pool of available numbers may governed and/or monitored to prevent recently released numbers from being immediately re-assigned. Such variations may be useful to allow a "buffer" time between phone number connections so that there is less chance of a caller being connected to an unexpected advertiser. A phone number connection is logged 1010 to create a record of the association between the ad and the phone number. In addition to being stored in a log, some variations may also maintain a database and/or database table(s) indicating current connections between phone numbers and advertisements. Such data may be useful not only for tracking phone number allocations, but also for identifying patterns and trends in number allocation and caller response/behavior.

In further variations, another listing and/or database may be maintained of recently released numbers along with an associated buffer period time. In yet further variations, a table indicating current and/or stale connections between advertisements and numbers may be maintained, with current connections having a connection start time only, and stale connection having a connection start time and a connection release time. In further variations still, a particular number and/or a particular associated ad may have a connection history indicating the numbers and/or ads connected thereto and the associated geo-temporal characteristics thereof.

After a phone number has been connected to an advertisement 1080, the number-connected ad may be served on the appropriate publisher site(s) 1020 (and, in some cases, in the appropriate times and/or regions) and the ad serving event may be measured and stored 1030. The first and/or initial ad serving event 1020 may also trigger or otherwise initiate the monitoring of a connection time period for the phone number and the ad. This may be determined from the ad serving event itself 1020 or from an associated measurement or acknowledgement 1030 of the event. In some variations, such initial monitoring time may be included in or associated with a current and/or complete listing of ad and phone number connections as discussed above.

In some variations, the number-connected ad will be served 1020 with the phone number displayed in, on, or with the ad. Someone viewing the ad may therefore note the phone number and dial it at some point after viewing the ad. When the phone number is dialed, a call to the number is registered 1040 or otherwise identified to the number allocation system. Some variations of phone number allocation may employ telephone numbers specifically controlled and/or monitored by the entity performing the phone number allocation and/or the number to ad connection. In such variations, a telephony and/or voice-over-IP type system maybe connected to the number allocation and number to ad connection system(s), allowing for immediate notification of a call to a number controlled by the entity. In other variations, a pool of numbers may be made available and monitored by a separate telephony and/or voice-over-IP system, requiring some level of interface/communication between the owner of the phone numbers and the number to ad connection system.

When a phone call to a number is registered 1040 in the ad serving system, a number-connected ad is identified based on the information about the current and/or comprehensive connections between ads and phone numbers. In some instances, a phone call may occur to an un-assigned or re-assigned telephone number or may be an accidental or incorrect call to a wrong number. In such variations, a length of time associated with the call may be monitored to help rule-out mis-dials and wrong numbers and other situations where a caller is reaching an incorrect, unexpected, or inactive/invalid call destination. In those instances where the dialed number is actively connected to an ad, the ad connected to the number is identified 1050 and the call event is logged 1030 for the ad. In variations configured to track call duration and/or monitor a call for keywords to rule out mis-dials, accidental calls, and other wrong numbers, the identification of the ad connected to the number 1050 may be predicated on the call satisfying some set of validity criteria. In such instances, the identification of the connected ad 1050 and the associated call event logging 1030 may not take place until after the registered call 1040 is completed. In some variations, each number-connected ad may be served 1020 only once. In such variations, each phone number is assigned to a unique potential ad impression and/or set of impressions. Such variations enable the determination of ad impressions for a particular ad serving event. In some variations, such granular ad impression data may enable highly localized ad campaigns Once the ad (or ad serving instance) is identified 1050 and logged 1030, the call may be attributed to the publisher site(s) 1090 where the ad was displayed. Such attribution enables improved establishment and analysis of ad impressions and ad campaign effectiveness with respect to particular publishers. For arrangements where a publisher is paid on a per-impression basis for presenting a particular ad on their site, such a solution enables much better cost allocation based on effective impressions as compared to ad display events.

During those periods when phone number response is unlikely, the association between the advertisement and the phone number may be severed, making the phone number available for association with a different advertisement for ad impression tracking. Using such a dynamic phone number assignment and release approach, a model may be developed whereby a limited pool of phone numbers may be associated with a potentially infinite pool of advertisements on the understanding that only a portion of the advertisements will be served/displayed on publisher sites in any given geographic region for any given time period.

Figure 2:
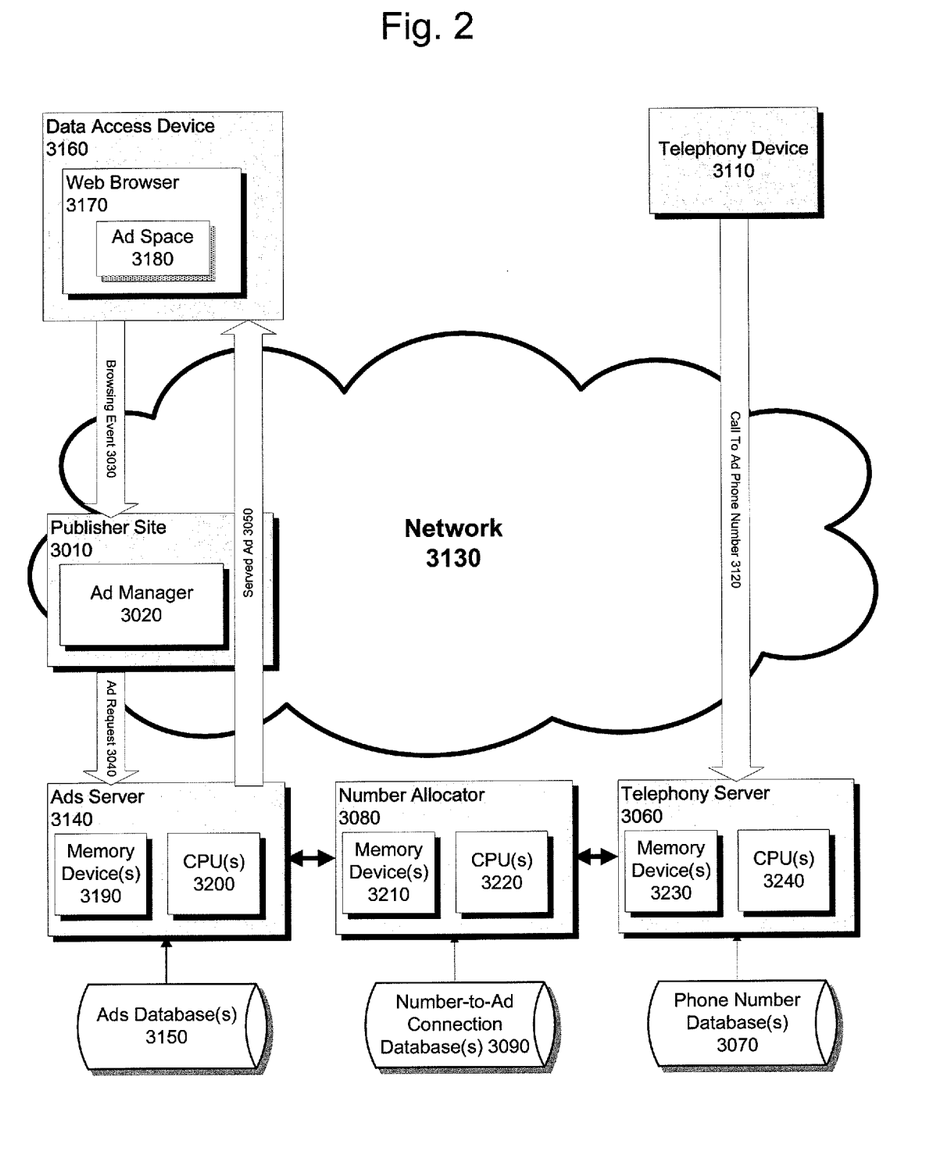
FIG. 2 depicts an embodiment of a system for phone number allocation, serving ads connected with phone numbers, and identifying ad-related phone calls.

An embodiment of a system for phone number allocation, serving ads connected with phone numbers, and collecting information about ad-related phone calls is depicted in FIG. 2. In the embodiment shown, a data access device 3160 such as a computing device may be equipped with a web browser 3170 or similar online information access utility. Such a web browser 3170 may have allocated or dedicated 3180 ad space for advertisements to be displayed thereon or therein during web page browsing. During a browsing event 3030, which includes accessing or navigating to, from, or between web page(s), the web browser may attempt to access and display content from a publisher website 3010. A publisher website 3010 may include one or more web pages and may also be equipped with an ad manager 3020 that controls the presentation of advertisements in conjunction with requested online content. The Publisher site 3010, via the ad manager 3020 or some other notification/request mechanism, may generate an ad request 3040 based on the browsing event 3030. The ad request 3040 is transmitted, via a communication network 3130, to an advertisement server 3140. The server may be equipped with one or more memory device(s) 3190 and one or more processor(s) 3200 for storing, sorting, selecting, identifying, and/or serving ads 3050 to a data access device 3160 via a publisher site 3010 over one or more communication network(s) 3130. The served ad(s) 3050 may be selected from one or more ads database(s) 3150 that store a range of advertisements including ads connected to telephone numbers.

When a served ad 3050 is a telephone number bearing ad, a user interacting with the web browser and/or data presentation portion 3170 of a data access device 3160 may make note of that telephone number and either immediately after noting or, or at some future point, may dial the telephone number from a telephony device 3110.

Variations of a data access device may include a smartphone, laptop and/or desktop computer, an information kiosk in a store or public location, an internet-capable billboard, and any other device configured to present online content to one or more individuals.

Variations of a telephony device 3110 may include a landline, wireless, mobile, cellular, and/or satellite telephone, a voice-over-IP device, a computing device equipped with telephone dialing/connection capability, a web-based telephony application/tool, or any other communication system or technology configured for making information exchange connections via a network 3130 using telephone numbers.

The call from the telephony device 3110 to the phone number of the advertisement 3120 may be directed to a telephony server 3060. A telephony server 3060 may include one or more computing devices equipped with one or more memory device(s) 3230 and processor(s) 3240, or may include an application running on one or more such computing devices. The telephony server 3060 registers the incoming call and routes it to the desired call destination by means of phone number routing protocols, lookup tables, and/or one or more phone number database(s) 3070 indicating destinations associated with various phone numbers. The telephony server also identifies the destination phone number to a number allocator 3080.

Variations of a phone number allocator 3080 may include one or more computing devices equipped with one or more memory device(s) 3210 and processor(s) 3220, or may include an application running on one or more such computing devices. Further variations of a phone number allocator 3080 may be part of an ads server 3140 and/or a telephony server 3060. The number allocator 3080 connects and disconnects telephone numbers with advertisements according to one or more number allocation schemes, and also registers and analyzes incoming calls and identifies their connected advertisements (if any). The connections between telephone numbers and advertisements may be maintained in one or more connection database(s) 3090. When the telephony server identifies the phone number of an incoming call 3120 to the number allocator 3080, the number allocator 3080 may query the connection database(s) to inform the telephony server whether the number is associated with an active advertisement connection and/or may also inform the ads server of a telephone call to an advertisement served 3050 in connection with a publisher's site 3010.

In some variations one or more of the ads server 3140, number allocator 3080, and telephony server 3060 may also communicate with one or more logs database(s) (not shown) where ad serving, incoming call, number connection, number disconnection, and ad request events may be logged for later user and/or analysis.

Figure 3:
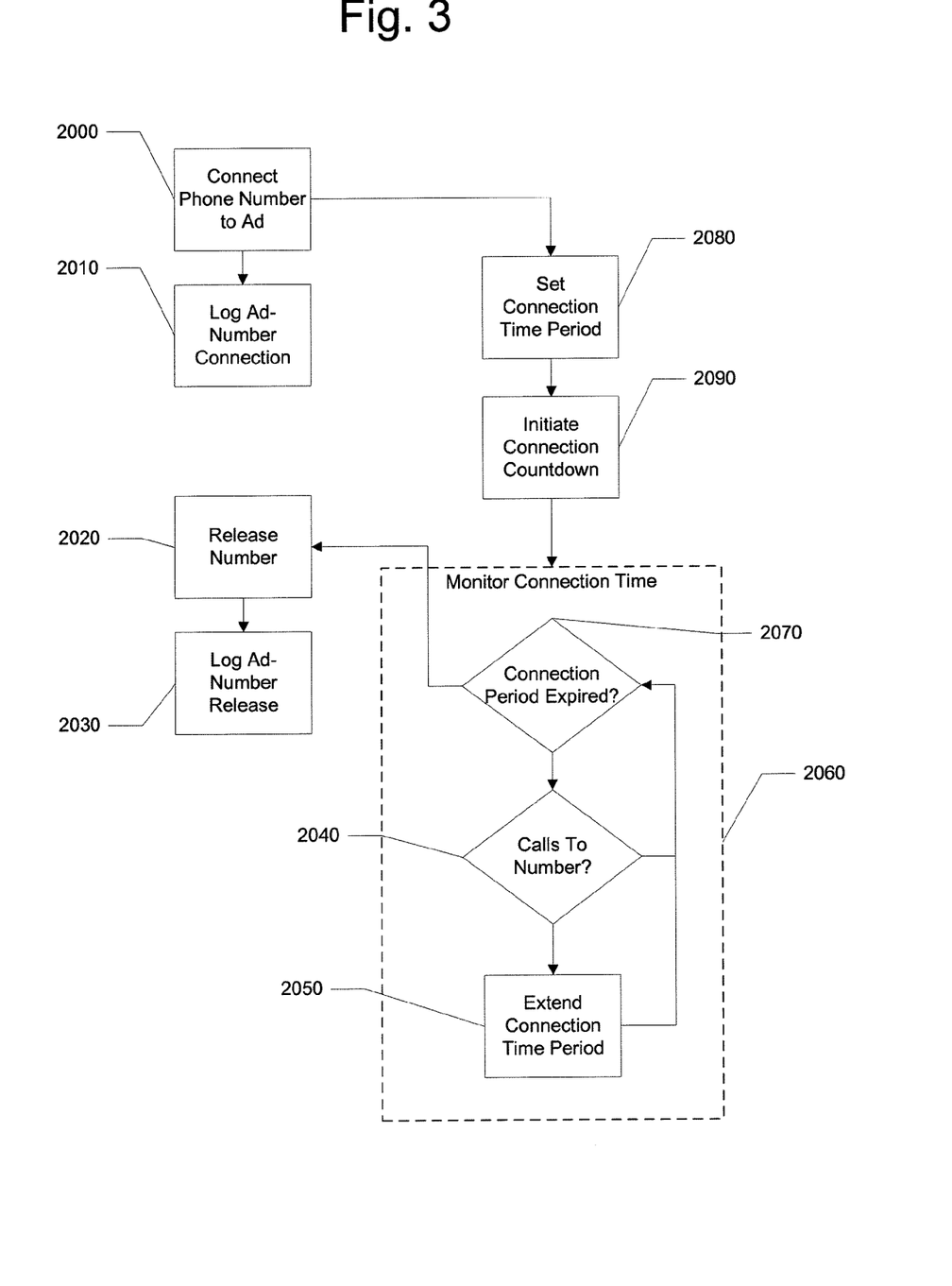
FIG. 3 depicts a block diagram of an embodiment of a phone number assignment management and allocation method according to some variations described herein.

FIG. 3 shows an embodiment of a telephone number allocation scheme that may be implemented in a phone number allocation and ad impression data collection system as discussed herein. In the embodiment shown, an available phone number may be connected to a particular advertisement associated with a publisher's site 2000. The phone number may be selected from a pool of available phone numbers based on a range of characteristics including geo-temporal factors. Geographic factors may include regional dialing and/or language concerns so that the phone number will not be a long-distance call for those regions where it is meant to be displayed and/or so that the person answering the phone will be likely to speak the caller's language. Available numbers may be identified as those telephone numbers that are either currently not connected with an advertisement and/or numbers that have not been connected with an advertisement for at least a certain predetermined time period. In some variations, a particular advertisement may be configured such that it is served only once, thereby ensuring that any ad impression data collected from calls to its associated number are for that particular ad serving instance only.

In some variations, each call may be priced differently. In such variations, each individual instance of ad presentation may be associated with a different phone number. An advertiser in such a scenario may place a bid for the inclusion of a phone number in a presented ad, with the advertiser being charged on a per-call basis according to the unique phone number assigned to the particular ad serving instance. Advertiser bidding and price determination may be conducted via one or more action and/or price allocation schemes currently known in the art.

After a number is connected to an advertisement, the connection is logged 2010 and a connection time period is established 2080. In some variations, a connection time period may be a default fixed period of time, such as 20 minutes or 2 hours. In other variations, connection time periods may vary according to geo-temporal factors. For example, a connection period for an advertisement shown during the late evening may be especially long to allow for the possibility of next-day phone calls or especially short to allow for re-use of the number on the assumption that most potential callers will call before going to sleep or not at all. In another example, the connection time period for an advertisement displayed in a region known to have limited telephone resources may be longer than the connection time period for a region where most users have immediate access to a telephone. In yet further variations, a connection time period may be dynamically generated based on a formula that considers a range of factors, including at least one of: geo-temporal factors, the particular advertisement, a vertical associated with the advertisement, the particular publisher site(s), and/or keywords associated with the advertisement, vertical, and/or publisher.

In some situations where a unique number is assigned to an individual advertisement 2000, exceptionally high call volumes 2040 may lead to too many simultaneous incoming impressions for a given ad. Such a scenario may tie up a large amount of allocated phone numbers or otherwise slow down or curtail the process of phone number release 2020 and re-allocation. In such scenarios, a number allocation and/or management system 3080 may decide to stop showing a phone number on a certain percentage of advertisement presentation instances for a given ad. In some variations, this decision may be based on a calculated probability of having an available phone number given a current response rate and allocation level. In such cases, when the probability drops below a certain threshold, the system may opt to start suppressing allocation/display of a phone number for certain ad presentation instances.

Once a connection time period is established 2080, a connection countdown may be initiated 2090 by a triggering event that begins measuring the available time left to keep the phone number connected to the advertisement. Such a triggering event may include the setting of the connection time period 2080. In some variations, such a triggering event may include an initial ad serving event indicating the first time or first time period when the connected ad is served. In further variations, each subsequent ad serving event may re-start the connection countdown. In yet further variations, the connection countdown may be initiated 2090 at a predetermined time period during which the advertisement is available for serving.

Once the connection time countdown is initiated 2090, a connection time monitoring operation 2060 begins. If the connection period has not yet expired 2070, one or more activity and/or event logs may be examined to determine if there have been incoming calls to the number 2040. If there have been no calls to the number, the connection time monitoring continues reducing the available connection time until time expires. If there have been one or more calls to the number since the last check 2040, the connection time period may be extended 2050 by a predetermined, fixed, or dynamically determined amount.

The connection time period may be extended 2050 to account for unexpectedly strong response and/or because of a short initial connection time that allows numbers to be disconnected more quickly from low-response ads. In some variations, there may be a set upper limit to the extendable connection time and/or to the number of connection time extensions 2050 allowed. An ad campaign may, for budget and/or market targeting reasons, be limited to only a certain time period, for instance. In some variations, the connection time may be extended by varying amounts based on the number of calls to the number since the last check and/or based on the amount of time remaining for the connection.

In some variations, time extensions may be for small or negligible amounts when more than some percentage of connection time is remaining, whereas extension time amounts may increase as there is a decreasing amount of remaining connection time. Such an approach may allow for the extension of number connection times for successful/high-response ad campaigns while eliminating artificial connection inflation due to strong response within the initially allotted connection time period. In other variations, time extensions may also be determined by the number of calls logged to a number between connection time monitoring cycles. In some variations, the more calls logged to the number, the longer the extension time granted to the number-ad connection. In other variations, call spike behavior may decrease the amount of extension time granted and/or even reduce the total amount of available connection time. Such an approach may be suitable when a certain overall number of responses is expected and spikes in call volume indicate a drastic reduction in future potential respondents.

In further variations, the pool of available numbers may be diminished simply due to a large number of simultaneous advertising campaigns that rely on or otherwise use included phone numbers in the advertisements. In such variations, when a number allocation rate and/or an expected number availability indicator reaches a certain level, the system may begin taking measures to ensure the availability of allocatable phone numbers. Such measures may include shortening the hold/association time between a number and an ad, setting a bid threshold to make number inclusion more expensive, and/or suspending phone number association/display for certain intervals until the available number pool and/or allocation rate return to acceptable levels.

If the connection period is determined to have expired 2070, the phone number is released and/or disconnected from the ad 2020 and the release is logged 2030. Such a released number 2020 may be immediately made available to a phone number pool for subsequent number connection, or may be relegated to a buffer pool where numbers may be held for some time period to ensure that any calls made to the disconnected number are not immediately and without warning connected to a different advertiser. In some variations, the net overall connection time afforded to the number may determine the amount of time it must spend in such a buffer pool before becoming available for connection to a subsequent advertisement. In some variations, phone numbers with longer overall connection times, due either to predetermined connection time settings, time period extensions, and/or other factors related to number allocation, may be more likely to be contacted after disconnection and therefore may require a longer buffer time before being connected to a different advertisement.

Only exemplary embodiments of the present invention are shown and described in the present disclosure. It is to be understood that the present invention is capable of use in various other combinations and environments and is capable of changes or modifications within the scope of the inventive concept as expressed herein. Some variations may be embodied in combinations of hardware, firmware, and/or software. Some variations may be embodied at least in part on computer-readable storage media such as memory chips, hard drives, flash memory, optical storage media, or as fully or partially compiled programs suitable for transmission to/download by/installation on various hardware devices and/or combinations/collections of hardware devices. Such variations are not to be regarded as departure from the spirit and scope of the invention, and all such modifications as would be obvious to one skilled in the art are intended to be included within the scope of the following claims:

The invention claimed is:

1. A method of managing a pool of phone numbers to be associated with advertisements and for attributing an ad impression on publisher media outlets based on a call to an associated phone number, the method comprising:
   connecting a unique phone number from the managed phone number pool with an advertisement such that each unique phone number is associated with only one advertisement;
   setting a connection time period for the connection between said phone number and said connected advertisement;
   serving the connected advertisement via the media outlet, where the unique telephone number is displayed in the advertisement;
   initiating a countdown of the connection time upon said serving;
   registering a call to the unique telephone number;
   identifying the connected advertisement connected to the unique phone number;
   attributing an ad impression to the media outlet based on the identified advertisement in response to the registered call;
   checking, after said initiating, if the connection period is expired;
   if the connection period is expired, releasing the connection between the phone number and the connected advertisement such that the number is no longer connected to the ad; and
   if the connection period is not yet expired,
      determining if at least one call was made to the connected number between a current checking step and a previous checking step;
      adjusting a remaining time for the connection period based on said determining; and
      waiting a predetermined time before performing a subsequent checking step.

2. The method of claim 1, where the media outlet is a website.

3. The method of claim 1, where said advertisement is an advertisement directed towards at least one of a particular geographic region and a particular time period.

4. The method of claim 3, where the unique telephone number is a telephone number that is a local and/or toll-free call in the particular geographic region.

5. The method of claim 1, where said identifying includes determining if the unique telephone number is still associated with the connected advertisement.

6. The method of claim 1, where said connecting includes recording data about the unique phone number and the connected advertisement in a connection database,
   where said releasing includes indicating, in said connection database, that the recorded data does not pertain to an active number to advertisement connection, and
   where said identifying includes querying the connection database.

7. The method of claim 1, where said serving further includes serving the connected ad in response to an advertisement request from the media outlet.

8. The method of claim 1, where the media outlet is an electronic billboard.

9. The method of claim 1, where said serving includes serving the connected advertisement only once via the media outlet.

10. The method of claim 1, the method further comprising monitoring a size of the available number pool and suppressing display of the unique telephone number when the number pool is below a threshold size.

11. The method of claim 1, where connecting includes creating at least one connected advertisement from an advertisement by connecting the advertisement to a unique phone number.

12. The method of claim 11, the method further comprising monitoring a call volume associated with the advertisement and suppressing display of the unique telephone number for connected advertisements created from that advertisement when the call volume for that advertisement is above a threshold level.

13. The method of claim 1, where said determining includes determining a total number of calls to the connected number between the current and previous checking steps.

14. The method of claim 1, where said adjusting includes increasing the remaining time by an amount based on a difference between the remaining connection time and a total connection time.

15. The method of claim 1, where said adjusting includes decreasing the remaining time by an amount based on at least one of: a size of the number pool, a unique phone number allocation rate, and an allocated unique phone number release rate.

16. A method of managing a phone number pool for tracking ad impressions on publisher media outlets, the method comprising:
   connecting a unique phone number from an available number pool with an advertisement such that each unique phone number is associated with only one advertisement;
   setting a connection time period for the connection between said phone number and said advertisement;
   initiating a countdown of the connection time based on a predetermined countdown initiation event;
   checking, after said initiating, if the connection period is expired;
   if the connection period is expired, releasing the connection between the phone number and the advertisement such that the number is no longer connected to the ad; and
   if the connection period is not yet expired,
      determining if at least one call was made to the connected number between a current checking step and a previous checking step;
      adjusting a remaining time for the connection period based on said determining; and
      waiting a predetermined time before performing a subsequent checking step.

17. The method of claim 16, where said determining includes determining a total number of calls to the connected number between the current and previous checking steps.

18. The method of claim 16, where said adjusting includes increasing the remaining time by an amount based on a difference between the remaining connection time and a total connection time.

19. The method of claim 16, the method further comprising allowing advertisers to bid on number-connected ads and connecting the unique phone number with an advertisement based on available number pool size and an associated advertiser bid for that advertisement.

20. The method of claim 16, where said adjusting includes decreasing the remaining time by an amount based on at least one of: a size of the number pool, a unique phone number allocation rate, and an allocated unique phone number release rate.

21. A system for managing a phone number pool for tracking ad impressions on publisher media outlets, the system comprising:
- a number allocator that connects a unique phone number from an available number pool with an advertisement such that each unique phone number is associated with only one advertisement;
- a number-to-ad connection database, operably connected to the number allocator, that stores a connection time period for the connection between said phone number and said advertisement;
- where the number allocator is configured to:
  - initiate a countdown of the connection time based on a predetermined countdown initiation event;
  - query the number-to-ad connection database to determine if the connection period is expired; and
  - if the connection period is expired:
    - to release the connection between the phone number and the advertisement such that the number is no longer connected to the ad and update the number-to-ad connection database accordingly; and
  - if the connection period is not yet expired,
    - to determine, by checking with a telephony server, if at least one call was made to the connected number between a current query operation and a previous query operation;
    - adjust a remaining time for the connection period based on a number of determined calls; and
    - wait a predetermined time before performing a subsequent query operation.

22. A non-transitory computer-readable medium having embodied thereon a program that, when executed by one or more processors, causes said one or more processors to carry out a method of managing a pool of phone numbers to be associated with advertisements and for attributing an ad impression on publisher media outlets based on a call to an associated phone number, the method comprising:
- connecting a unique phone number from the managed phone number pool with an advertisement such that each unique phone number is associated with only one advertisement;
- setting a connection time period for the connection between said phone number and said connected advertisement;
- serving the connected advertisement via the media outlet, where the unique telephone number is displayed in the advertisement;
- initiating a countdown of the connection time upon said serving;
- registering a call to the unique telephone number;
- identifying the connected advertisement connected to the unique phone number;
- attributing an ad impression to the media outlet based on the identified advertisement in response to the registered call;
- checking, after said initiating, if the connection period is expired;
- if the connection period is expired, releasing the connection between the phone number and the connected advertisement such that the number is no longer connected to the ad; and
- if the connection period is not yet expired,
  - determining if at least one call was made to the connected number between a current checking step and a previous checking step;
  - adjusting a remaining time for the connection period based on said determining; and
- waiting a predetermined time before performing a subsequent checking step.

* * * * *